May 19, 1970     T. H. ENGLE     3,512,615
HYDRAULIC TREAD BRAKE UNIT AND SUPPORT MEANS THEREFOR
Filed Jan. 3, 1969     2 Sheets-Sheet 1
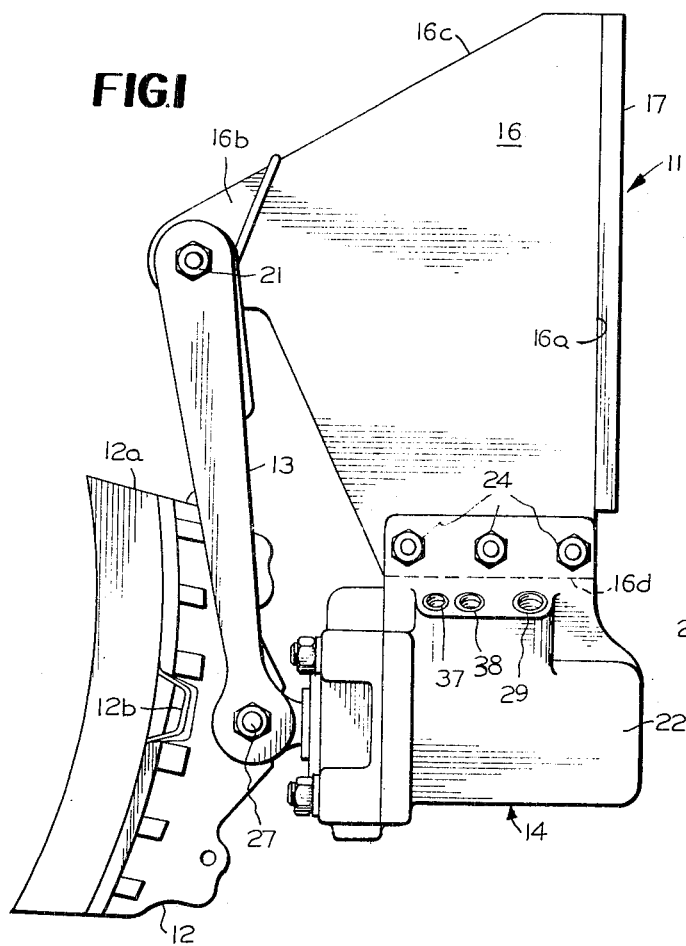
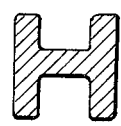
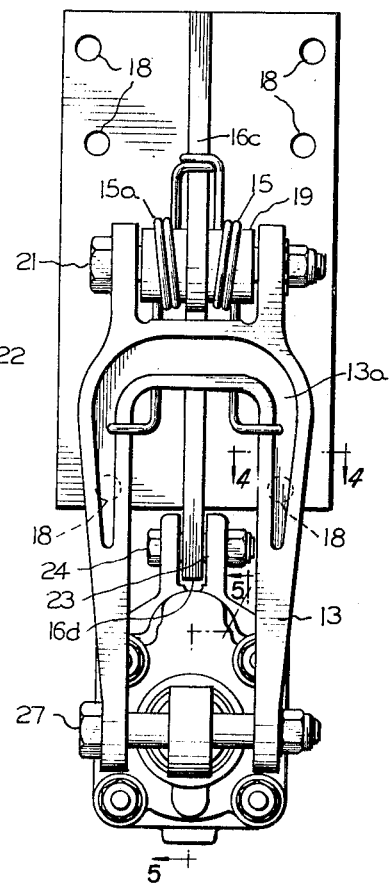
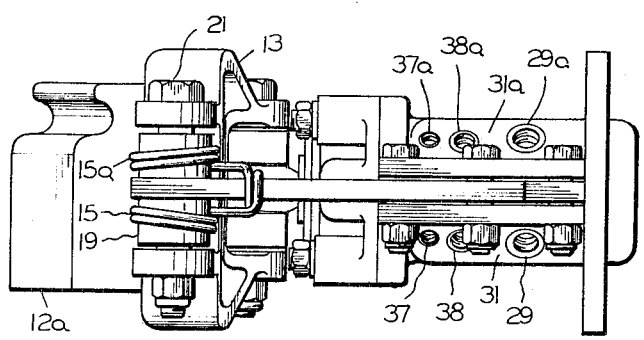
INVENTOR
THOMAS H. ENGLE
BY *Dodge & Ostmann*
ATTORNEYS

United States Patent Office

3,512,615
Patented May 19, 1970

3,512,615
HYDRAULIC TREAD BRAKE UNIT AND SUPPORT MEANS THEREFOR
Thomas H. Engle, Cape Vincent, N.Y., assignor to General Signal Corporation, a corporation of New York
Filed Jan. 3, 1969, Ser. No. 788,775
Int. Cl. F16d 49/00
U.S. Cl. 188—74      3 Claims

ABSTRACT OF THE DISCLOSURE

Hydraulically operated tread brake units for railway cars which are free of force-multiplying linkages and slack adjusters and can be serviced without detrucking the cars or removing the wheels.

BACKGROUND AND SUMMARY OF THE INVENTION

Air operated tread brake units are in common use today on the railroads, but every current design of which I am aware is characterized by the same major disadvantages. Without exception, these units include force-multiplying linkages and slack adjusters, which are bulky and present maintenance problems, and servicing requires either removal of the truck or the wheels.

The object of this invention is to provide a compact tread brake unit which is relatively easy to construct and install, and which is free of the disadvantages just mentioned. The improved tread brake unit incorporates a hydraulic cylinder which is intended to receive the output of an air-to-hydraulic translator of the type disclosed in co-pending application Ser. No. 746,684, filed July 22, 1968 now abandoned. Since the pressure of the motive fluid supplied to this device is a multiple of the output pressure of the air brake control valve, and the translator itself inherently performs a slack compensating function, the tread brake unit requires no bulky force-multiplying and slack adjusting mechanisms. In addition, the inclusion of a hydraulically operated locking mechanism of the type discolsed in co-pending application Ser. No. 726,766, filed May 6, 1968, permits the unit to perform hand braking as well as service braking functions.

The new tread brake unit is characterized by few parts and several features which facilitate manufacturing, installation and servicing. The device comprises only five main components: a supporting bracket, a conventional brake head, a cast hanger for the brake head, a retraction spring, and a hydraulic cylinder assembly. The supporting bracket is composed of flat plates connected together to form a T by straight welds. The plates are easy to fabricate, and the welds for a group of brackets can be completed in a single pass of an automatic welding machine. The retraction spring takes the form of torsion spring means which encircles the pivot axis of the hanger and reacts directly between the hanger and the bracket. This arrangement is compact and obviates separate spring-attaching lugs or seats. The cylinder assembly is attached to the bracket by a bolted tongue and groove joint, and its piston acts on the hanger through a push rod. Minimum bolt size is assured by the fact that the bolts are loaded in double shear. Servicing of the unit is accomplished easily by merely removing the cylinder-mounting bolts and sliding the assembly from the push rod. Unless repair or replacement of the assembly itself is needed, servicing does not require removal of the hydraulic lines. Finally, the port or ports through which oil is delivered to and from the cylinder assembly are located and arranged so that the use of elbows or like fittings on the ends of the hydraulic lines is unnecessary.

BRIEF DESCRIPTION OF THE DRAWINGS

The preferred embodiment of the invention is described herein with reference to the accompanying drawings in which:

FIGS. 1, 2, and 3 are side elevation, end, and plan views, respectively, of the improved tread brake unit, the brake head being omitted from FIG. 2 for reasons of clarity.

FIG. 4 is a sectional view taken on line 4—4 of FIG. 2.

DETAILED DESCRIPTION OF PREFERRED EMBODIMENT

Figure 5:
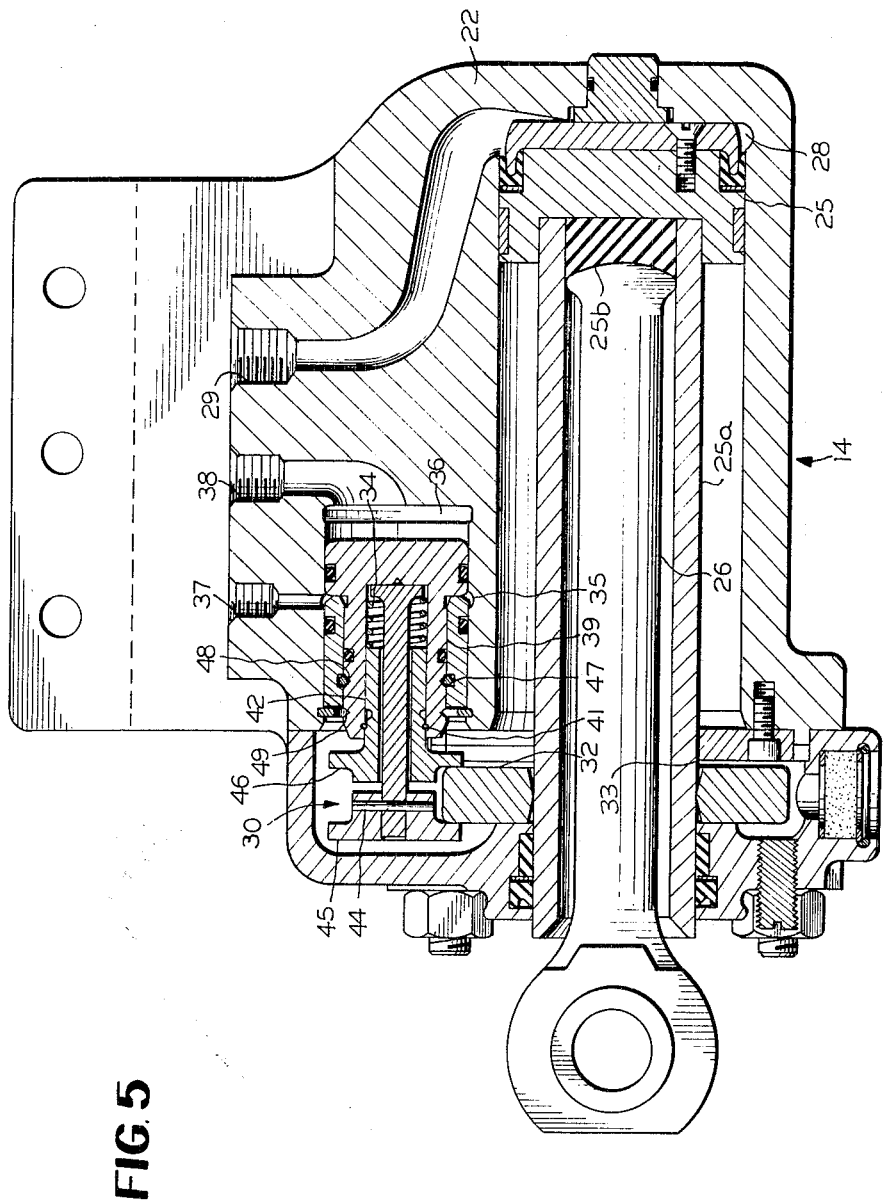
FIG. 5 is an enlarged sectional view taken generally on line 5—5 of FIG. 2 and showing the internal structure of the hydraulic cylinder assembly.

Referring specifically to FIGS. 1–4, the improved tread brake unit comprises supporting bracket 11, a conventional brake head 12, pivoted hanger 13, hydraulic cylinder assembly 14, and torsion springs 15 and 15a. Bracket 11 consists of a flat support plate 16 which is welded along opposite sides of its straight longitudinal edge 16a to a flat base plate 17 to form a T. As indicated earlier, the brackets 11 can be welded in a group by merely aligning the constituent plates 16 and 17 of each bracket in a jig so that all the joints on the same side can be welded in a single pass. Plate 17 is pierced by six bolt holes 18 arranged in the same pattern as the mounting holes on the conventional "GF" type tread brake unit, and which receive the bolts used to attach the unit to a transom of the truck frame.

At its left side, as viewed in FIG. 1, support plate 16 is formed with a nose 16b which is drilled to receive a sleeve 19 which is normal to the plate and is welded in place. The sleeve 19 serves as a bearing for the pivot bolt 21 from which hanger 13 depends. The torsion springs 15 and 15a encircle sleeve 19 at opposite sides of plate 16, and their free ends are bent over the inclined edge 16c of plate 16 and the flange of the I-section 13a of hanger 13. This arrangement is compact, provides protection for the springs, and makes unnecessary the inclusion of special spring seats.

The reaction forces acting on the brake shoe during a brake application tend to shift head 12 and hanger 13 transversely of the wheel, so it is necessary to provide some lateral restraint for the hanger. One possibility is to employ stay rods which interconnect the hangers of corresponding units at opposite sides of the car, but I prefer the simpler approach of using flanged shoes 12a.

Hydraulic cylinder assembly 14 has a cast housing 22 formed with a groove 23 which receives the lower, transverse edge 16d of plate 16 and forms therewith a tongue and groove joint which is held together by three bolts 24. The bolts 24 are loaded in double shear, so their cross sectional area can be kept to a minimum. The piston 25 of assembly 14 (see FIG. 5) acts upon hangar 13 through a push rod 26 which slides within piston rod 25a and whose right end abuts the cushion 25b. At its left end, push rod 26 is pivotally connected to hanger 13 by the pivot bolt 27 which carries brake head 12. The stroke of piston 25 is long enough to accommodate not only shoe and wheel wear, but also the height of key bridge 12b. This is necessary in order to permit replacement of worn shoes. Piston 25 responds to the pressure in a working space 28 which communicates with the car's hydraulic system through either a threaded port 29 which opens through the surface 31 or a threaded port 29a which opens through a corresponding surface 31a at the opposite side of plate 16. Only one of these ports is actually machined in housing 22; the choice between the two being based upon whether the unit is used on the right or the left side of the car and upon whether the hydraulic line is located in board or outboard of plate 16. The surfaces 31 and 31a are inclined with respect to plate 16 as shown so that the hydraulic line, which runs along the bottom of the car and thus approaches the unit from above, can be attached to port 29 or 29a without using an elbow fitting or causing the line to bow excessively. During servicing, assembly 14 can be removed from the tread brake unit by merely removing the three bolts 24 an moving the assembly down and to the right, as viewed in FIG. 1, so that it slides off push rod 26. The hydraulic line connected to port 29 or 29a usually takes the form of a flexible hose, so this line need not be broken unless assembly 14 needs shop repair or replacement.

Those tread brake units intended for use on wheels which do not require hand braking employ cylinder assemblies 14 having only the force applying parts described above. However, when hand braking is needed, assembly 14 incorporates a hydraulically operated mechanical lock. This version of the assembly is the one illustrated, and the lock mechanism 30 is constructed in accordance with the teachings of application Ser. No. 726,766. The lock mechanism includes a ring 32 which encircles piston rod 25a and is arranged to pivot about fulcrum point 33 between the illustrated unlock position, in which it is normal to and permits substantially free motion of the piston rod, and a canted, locking position in which the oblique corners defined by its flared inner peripheral surfaces frictional bind the piston rod and prevent its retraction. Ring 32 is biased toward locking position by spring 34 and is actuated by a pair of opposed fluid pressure motors 35 and 36. These motors are connected with the car's hydraulic system through either the ports 37 and 38 in surface 31 or the ports 37a and 38a in surface 31a depending upon the same factors which govern the choice between ports 29 and 29a. Motor 35 performs a locking function and acts upon ring 32 through piston extension 39, snap ring 41, sleeve 42, spring 34, rod 43, pin 44 and collar 45. Motor 36, on the other hand, serves to unlock ring 32 and acts upon it through extension 39, snap ring 41, and the flange 46 on sleeve 42. Positive insurance against inadvertent application or release of the lock is provided by a detent in the form of a snap ring 47 which is adapted to seat alternately in one of the other of a pair of V-shaped grooves 48 and 49 formed in piston extension 39.

During a service braking application, the hydraulic system supplies oil under pressure to port 29, but ports 37 and 38 remain vented. Therefore, piston 25 applies the brake, and lock ring 32 stays in the illustrated unlocking position. The force with which shoe 12a is pressed against the wheel is, of course, dependent upon the pressure supplied to working space 28, and this, in turn, depends upon the braking command (i.e. the pressure reduction in the brake pipe). During the subsequent brake release operation, the system withdraws oil from working space 28 and, since piston rod 25a is not locked torsion springs 15 and 15a are able to retract brake head 12 and piston 25. During a hand braking application, on the other hand, the system pressurizes both of the ports 29 and 37, so that, after piston 25 sets the brake, lock mechanism 30 is effective to hold it in application position. In this case, the brake will remain applied, even though the pressure at port 29 should dissipate as a result of leakage, until port 38 is pressurized and motor 36 is rendered effective to move ring 32 to the unlocking position. At that time, springs 15 and 15a will retract brake head 12 and cause piston 25 to displace oil from space 28 into the system exactly as in the case of a service release. The design and operation of the locking mechanism and the system are fully described in application Ser. No. 726,766, so further description here would be superfluous.

What is claimed is:
1. A hydraulic tread brake unit for railway cars comprising
 (a) a flat base plate (17) containing through holes (18) adapted to receive assembly bolts which secure the unit in place on the car;
 (b) a flat support plate (16) having a straight longitudinal edge (16a) and an intersecting transverse edge (16d), the support plate being welded to the base plate along the longiudinal edge to form a T-shaped bracket (11);
 (c) a brake head hanger (13) connected at one end to the support plate (16) for pivotal movement in application and release directions about a first axis normal to the plate and spaced from the welded connection to the base plate (17);
 (d) a brake head (12) connected to the opposite end of the hanger (13) for pivotal movement about a second axis parallel with the first axis;
 (e) torsion spring means (15, 15a) encircling the first axis and reacting between the support plate (16) and the hanger (13) for biasing the latter in the release direction;
 (f) a hydraulic cylinder assembly (14) for moving the hanger (13) in the application direction and including a housing (22) containing piston means (25, 25a, 25b) which responds to the pressure in a working space (28) and acts upon the hanger through a push rod (26), the push rod being pivotally connected to the hanger but merely in abutting engagement with the piston means;
 (g) a groove (23) in the housing (22) of the cylinder assembly receiving said transverse edge (16d) of the support plate and defining therewith a tongue and groove joint;
 (h) a plurality of bolts (24) extending through the tongue and groove joint and serving to secure the assembly (14) to the support plate (16); and
 (i) a port (29 or 29a) extending into the housing (22) from the support plate side thereof and communicating with said working space (28), the axis of the port being inclined relatively to the support plate (16).

2. A tread brake unit as defined in claim 1 in which
 (a) the housing (22) of the cylinder assembly (14) has two external surfaces (31 and 31a) located at opposite sides of said groove (23) and inclined away from the support plate (16); and
 (b) said port (29 or 29a) opens through one or the other of these surfaces (31 and 31a).

3. A tread brake unit as defined in claim 2 in which the torsion spring means comprises a pair of coiled torsion springs (15 and 15a) located at opposite sides of the support plate (16) and having free ends which are held by integral portions (13a and 16c) of the support plate (16) and the hanger (13), respectively.

References Cited

UNITED STATES PATENTS

| 418,573 | 12/1889 | Lawrence | 188—153 |
| 1,310,033 | 7/1919 | Peycke | 188—216 X |
| 2,805,736 | 9/1957 | Paulsen | 188—216 X |

FOREIGN PATENTS 749,183  12/1966  Canada.

GEORGE E. A. HALVOSA, Primary Examiner

U.S. Cl. X.R.
188—67, 153, 216